(12) United States Patent
Schroeder

(10) Patent No.: US 7,216,525 B2
(45) Date of Patent: May 15, 2007

(54) METHOD FOR COMPENSATION FOR A ZERO ERROR IN A CORIOLIS GYRO

(75) Inventor: Werner Schroeder, Ettenheim (DE)

(73) Assignee: LITEF GmbH, Freiburg (DE)

( * ) Notice: Subject to any disclaimer, the term of this patent is extended or adjusted under 35 U.S.C. 154(b) by 0 days.

(21) Appl. No.: 10/553,110

(22) PCT Filed: Mar. 26, 2004

(86) PCT No.: PCT/EP2004/003247

§ 371 (c)(1),
(2), (4) Date: Oct. 12, 2005

(87) PCT Pub. No.: WO2004/090470

PCT Pub. Date: Oct. 21, 2004

(65) Prior Publication Data

US 2006/0266099 A1     Nov. 30, 2006

(30) Foreign Application Priority Data

Apr. 14, 2003   (DE) ............................ 103 17 159

(51) Int. Cl.
*G01C 25/00* (2006.01)

(52) U.S. Cl. ...................................... 73/1.77

(58) Field of Classification Search ................... None
See application file for complete search history.

(56) References Cited

U.S. PATENT DOCUMENTS 5,908,986 A   6/1999   Mitamura
6,205,838 B1  3/2001   Schmid et al.

FOREIGN PATENT DOCUMENTS

| DE | 19845185 | 4/2000 |
|----|----------|--------|
| DE | 19939998 | 3/2001 |
| DE | 19910415 | 9/2001 |
| DE | 10062347 | 6/2002 |
| EP | 69615468 | 1/1997 |
| WO | 0114831  | 3/2001 |

*Primary Examiner*—Ribert Raevis
(74) *Attorney, Agent, or Firm*—Elliott N. Kramsky

(57) ABSTRACT

A method for compensation of the zero error of a Coriolis gyro. The frequency of the read oscillation is modulated. The output signal from a rotation rate control loop or quadrature control loop for the Coriolis gyro is demodulated in synchronism with the modulation of the frequency of the read oscillation to obtain an auxiliary signal. The auxiliary signal is a measure of the zero error. A compensation signal is produced and passed to the input of the rotation rate control loop or quadrature control loop, with the compensation signal being controlled such that the magnitude of the auxiliary signal is as small as possible.

6 Claims, 5 Drawing Sheets

METHOD FOR COMPENSATION FOR A ZERO ERROR IN A CORIOLIS GYRO

BACKGROUND

1. Field of the Invention

The present invention relates to a Coriolis gyros. More particularly, this invention pertains to a method for compensation for a zero error in a Coriolis gyro.

2. Description of the Prior Art

Coriolis gyros (also referred to as "vibration gyros") are in increasing use for navigation. They possess a mass system that is caused to oscillate with the oscillation generally being the superposition of a large number of individual oscillations.

The individual oscillations of the mass system are initially independent of one another and can be referred to abstractly as "resonators". At least two resonators are required for operation of a vibration gyro: one (the first resonator) is artificially stimulated to oscillate, and this is referred to below as the "stimulating oscillation". The other (the second resonator) is stimulated to oscillate only when the vibration gyro is moved/rotated. This is because Coriolis forces occur in this case that couple the first resonator to the second resonator, absorb energy from the stimulating oscillation for the first resonator, and transfer it to the read oscillation of the second resonator. The oscillation of the second resonator is referred to below as the "read oscillation".

In order to determine movements (in particular rotations) of the Coriolis gyro, the read oscillation is tapped off and a corresponding read signal (e.g. the read oscillation tapped-off signal) is investigated to determine whether any changes have occurred in the amplitude of the read oscillation, as they represent a measure of the rotation of the Coriolis gyro.

Coriolis gyros may be implemented as both open-loop and closed-loop systems. In a closed-loop system, the amplitude of the read oscillation is continuously reset to a fixed value (preferably zero) by control loops.

An example of a closed-loop version of a Coriolis gyro will be described below in conjunction FIG. 2, a schematic diagram of a Coriolis gyro in accordance with the prior art. The gyro 1 includes a mass system 2 that can be caused to oscillate and is also referred to below as a "resonator". (A distinction exists between this expression and the abstract "resonators" term previously employed for individual oscillations of the "real" resonator. As mentioned, the resonator 2 may be considered as a system composed of two "resonators" (a first resonator 3 and a second resonator 4). Each of the first and the second resonators 3, 4 is coupled to a force sensor (not shown) and to a tapping system (not shown). The noise produced by the force sensor and the tapping systems is indicated schematically by Noise1 (reference symbol 5) and Noise 2 (reference symbol 6).

The Coriolis gyro 1 includes four control loops. A first control loop controls the stimulating oscillation (that is to say the frequency of the first resonator 3) at a fixed frequency (resonant frequency). It comprises a first demodulator 7, a first low-pass filter 8, a frequency regulator 9, a VCO (voltage controlled oscillator) 10 and a first modulator 11.

A second control loop controls the stimulating oscillation at constant amplitude. It comprises a second demodulator 12, a second low-pass filter 13 and an amplitude regulator 14.

Third and fourth control loops are employed to reset the forces that stimulate the read oscillation. The third control loop includes a third demodulator 15, a third low-pass filter 16, a quadrature regulator 17 and a third modulator 22 while the fourth control loop comprises a fourth demodulator 19, a fourth low-pass filter 20, a rotation rate regulator 21 and a second modulator 18.

The first resonator 3 is stimulated at resonant frequency $\omega 1$. The resultant stimulating oscillation is tapped off, phase-demodulated by means of the first demodulator 7, and a demodulated signal component is supplied to the first low-pass filter 8 that removes the sum frequencies. (The tapped-off signal is also referred to below as the stimulating oscillation tapped-off signal.) An output signal from the first low-pass filter 8 is applied to a frequency regulator 9 which controls the VCO 10, as a function of the signal supplied to it, such that the in-phase component essentially tends to zero. The VCO 10 passes a signal to the first modulator 11, which controls a force sensor such that a stimulating force is applied to the first resonator 3. When the in-phase component is zero, the first resonator 3 oscillates at its resonant frequency $\omega 1$. (It should be noted that all of the modulators and demodulators are operated on the basis of resonant frequency $\omega 1$.)

The stimulating oscillation tapped-off signal is also applied to the second control loop and demodulated by the second demodulator 12. The output of the second demodulator 12 is passed through the second low-pass filter 13 whose output is, in turn, applied to the amplitude regulator 14. The amplitude regulator 14 controls the first modulator 11 in response to this signal and the output of a nominal amplitude sensor 23 to cause the first resonator 3 to oscillate at a constant amplitude (i.e. the stimulating oscillation has constant amplitude).

As mentioned above, Coriolis forces (indicated by the term $FC \cdot \cos(\omega 1 \cdot t)$ in FIG. 2) occur on movement/rotation of the Coriolis gyro 1. They couple the first resonator 3 to the second resonator 4, and thus cause the second resonator 4 to oscillate. A resultant read oscillation of frequency $\omega 2$ is tapped off and a corresponding read oscillation tapped-off signal (read signal) is supplied to both the third and the fourth control loops. This signal is demodulated in the third control loop by the third demodulator 15, sum frequencies are removed by the third low-pass filter 16, and the low-pass-filtered signal is supplied to the quadrature regulator 17. The output of the quadrature regulator 17 is applied to the third modulator 22 to reset corresponding quadrature components of the read oscillation. Analogously, the read oscillation-tapped-off signal is demodulated in the fourth control loop by the fourth demodulator 19, passed through the fourth low-pass filter 20, and the low-pass-filtered signal then applied to the rotation rate regulator 21 (whose output is proportional to the instantaneous rotation rate, and passed as a rotation rate measurement to a rotation rate output 24) and to the second modulator 18 that resets corresponding rotation rate components of the read oscillation.

A Coriolis gyro 1 as described above may be operated in both double-resonant and non-double-resonant forms. When operated in a double-resonant form, the frequency $\omega 2$ of the read oscillation is approximately equal to that of the stimulating oscillation ($\omega 1$). In the non-double-resonant case, the frequency $\omega 2$ of the read oscillation differs from $\omega 1$. In double resonance, the output signal from the fourth low-pass filter 20 contains corresponding information about the rotation rate. In contrast (non-double-resonant case), the output signal from the third low-pass filter 16 contains the rotation rate information. In order to switch between the double-resonant and non-double-resonant operating modes, a doubling switch 25 selectively connects the outputs of the third and the fourth low-pass filter 16, 20 to the rotation rate regulator 21 and the quadrature regulator 17.

As a result of unavoidable manufacturing tolerances, slight misalignments exist between the stimulating forces/resetting forces/force sensors/taps and the natural oscillations of the resonator 2 (i.e. the real stimulating and reading modes of the resonator 2). Such misalignments must be taken into account as the read oscillation tapped-off signal is otherwise subject to errors. In such a situation the read oscillation tapped-off signal thus includes a part that originates from the real read oscillation, and one that originates from the real stimulating oscillation. The undesired part causes a Coriolis gyro zero error of unknown magnitude as it is impossible to distinguish between these two parts when the read oscillation tapped-off signal is tapped off.

SUMMARY AND OBJECTS OF THE INVENTION

It is therefore an object of the invention to provide a method for compensating the above-described error.

The present invention provides, in a first aspect, a method for compensation for a zero error in a Coriolis gyro. In such method, the frequency of the read oscillation is modulated. The output signal from a rotation rate control loop or quadrature control loop for the Coriolis gyro is demodulated in synchronism with the modulation of the frequency of the read oscillation to obtain an auxiliary signal which is a measure of the zero error. A compensation signal is then produced and passed to the input of the rotation rate control loop or quadrature control loop. The compensation signal is controlled so that the magnitude of the auxiliary signal is as small as possible.

In a second aspect, the invention provides a Coriolis gyro that includes a device for determination of zero error. Such device includes a modulation unit that modulates the frequency of the read oscillation of the Coriolis gyro. A demodulation unit demodulates the output signal from a rotation rate control loop or quadrature control loop in synchronism with modulation of the frequency of the read oscillation to obtain an auxiliary signal that is a measure of the zero error. A control unit produces a compensation signal and passes it to the input of the rotation rate control loop or quadrature control loop. The control unit controls the compensation signal so that the auxiliary signal is as small as possible.

The foregoing and other features of the invention will become further apparent from the detailed description that follows. Such description is accompanied by a set of drawing figures. Numerals of the drawing figures, corresponding to those of the written description, point to the features of the invention with like numerals referring to like features throughout both the drawing figures and the written description.

DETAILED DESCRIPTION OF THE PREFERRED EMBODIMENT

Figure 3:
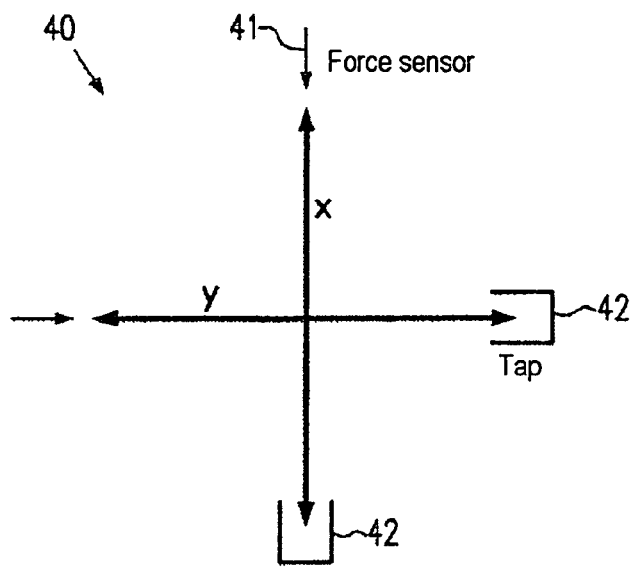
FIG. 3 is a vector diagram for illustrating the interaction of the resonator, force sensor system and tapping system in a Coriolis gyro.
Figure 4A:
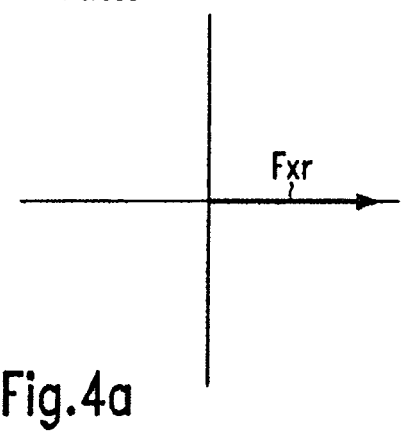
FIGS. 4a through 4d are a set of vector diagrams for illustrating forces and oscillation amplitudes for a Coriolis gyro at double resonance.
Figure 4B:
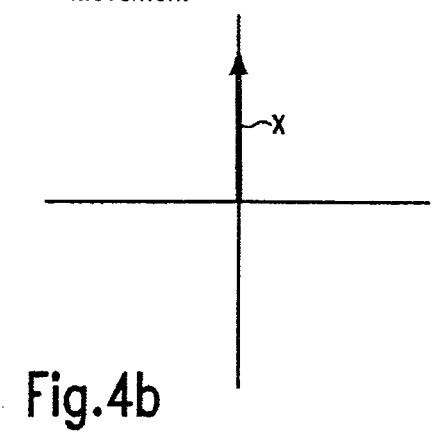
Figure 4C:
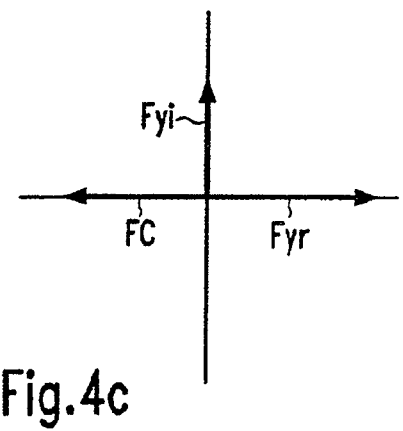
Figure 4D:
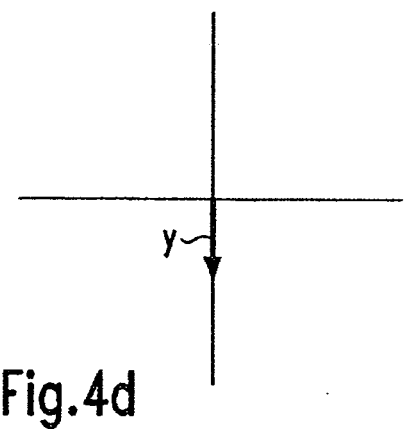

The general method of operation of a Coriolis gyro is explained again with reference to the vector diagrams of FIGS. 3 to 5 (Gaussian number plane). The method of the invention functions only at essentially double resonance (on average). Drawings labeled "close to double resonance" illustrate the changed conditions when the situation of "close to double resonance" occurs as a result of modulation of the resonant frequency of the read oscillation.

The vector diagram of FIG. 3 illustrates a Coriolis gyro (system 40) comprising a resonator (not shown), a force sensor system 41 and a tapping system 42. Possible oscillations x (stimulation) and y (read) are also indicated. Such oscillations are coupled to one another by Coriolis forces in the event of rotation at right angle to the plane of the drawing. The x oscillation (complex; purely imaginary at resonance) is stimulated by an alternating force with the complex amplitude Fx (in this case only the real part of Fxr). The y oscillation (complex) is reset by an alternating force of complex amplitude Fy with the real part Fyr and the imaginary part Fyi. (The rotation vectors $\exp(i*w*t)$ are omitted in each case).

FIGS. 4a to 4d illustrate the forces and oscillation amplitude for a Coriolis gyro at double resonance. That is they show the complex forces and complex oscillation amplitudes for an ideal Coriolis gyro with the same resonant frequency for the x and y oscillations. The force Fxr is controlled to produce a purely imaginary, constant x oscillation. This is achieved by the amplitude regulator 14 (which controls the magnitude of the x oscillation) and the phase regulator 10/frequency regulator 9 (which controls the phase of the x oscillation). The operating frequency $\omega 1$ is controlled so that the x oscillation is purely imaginary (i.e. the real part of the x oscillation is controlled to be zero).

Figure 5A:
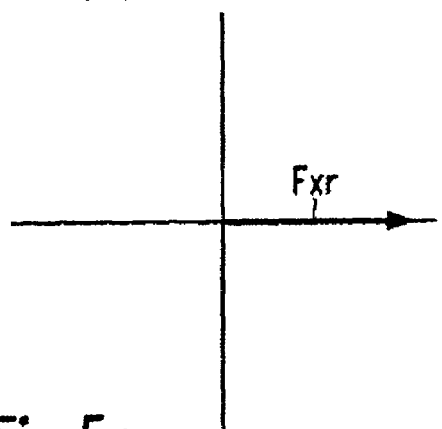
FIGS. 5a through 5d are a set of vector diagrams for illustrating forces and oscillation amplitudes for a Coriolis gyro close to double resonance.
Figure 5B:
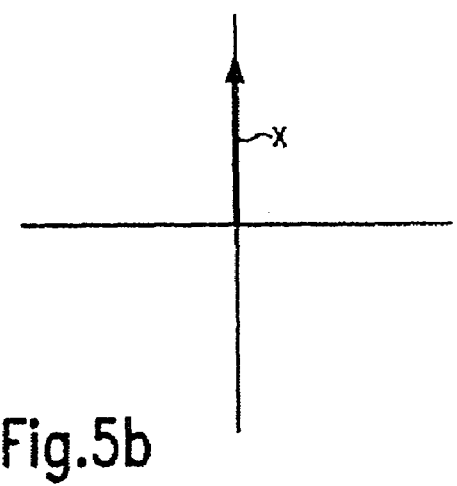
Figure 5C:
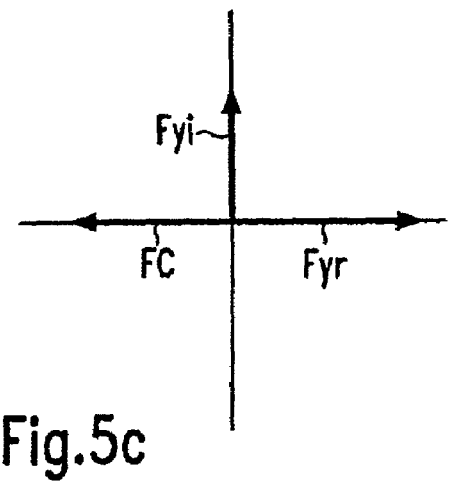
Figure 5D:
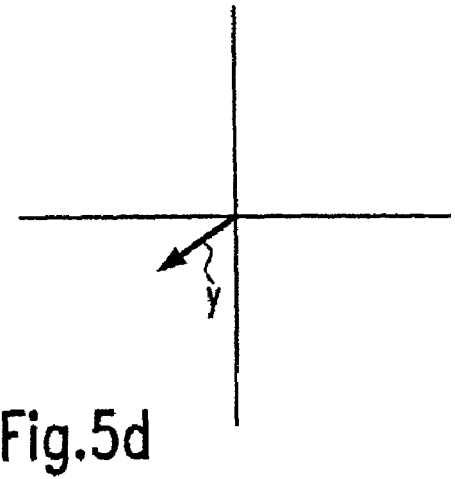
Figure 6A:
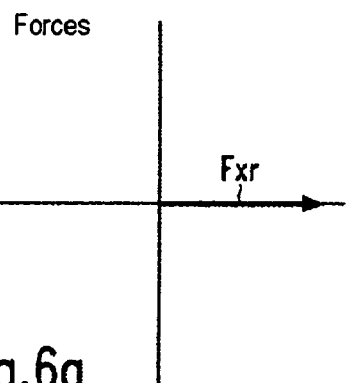
FIGS. 6a through 6d are a series of vector diagrams for illustrating the method according to the invention at double resonance.
Figure 6B:
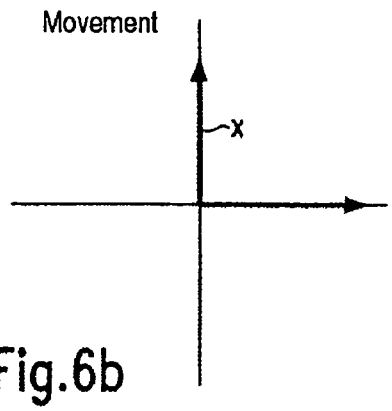
Figure 6C:
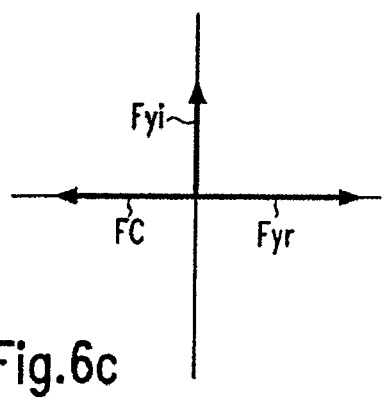
Figure 6D:
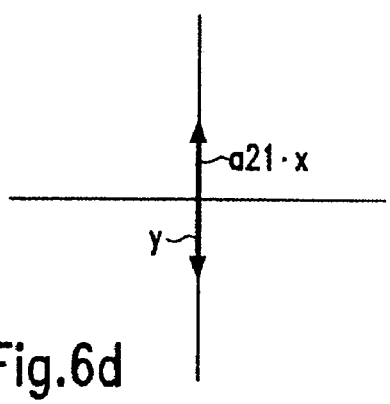
Figure 7A:
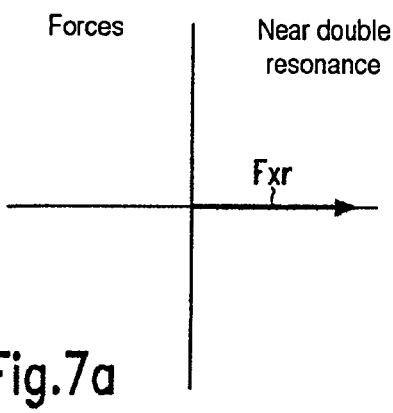
FIGS. 7a through 7d are a series of vector diagrams for illustrating the method according to the invention close to double resonance.
Figure 7B:
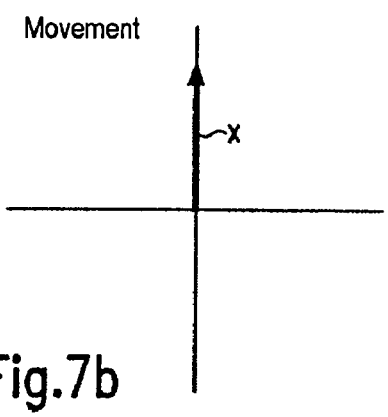
Figure 7C:
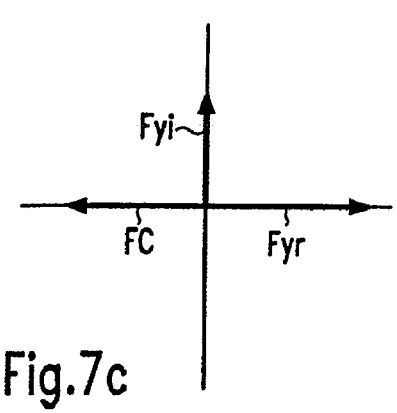
Figure 7D:
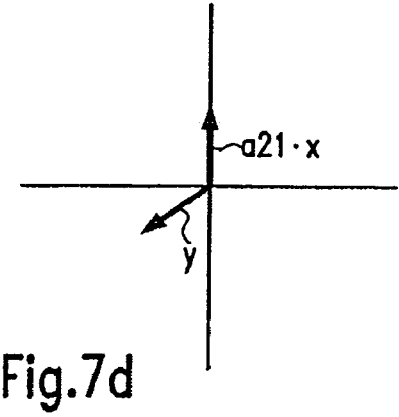

The Coriolis force during rotation, FC, is now purely real, since it is proportional to the speed of the x oscillation. If both oscillation have the same resonant frequency, then the y oscillation, caused by the force FC, has the form illustrated in FIG. 4d. If the resonant frequencies of the x and y oscillations differ slightly, then complex forces and oscillation amplitudes occur as illustrated in FIGS. 5a to 5d. In particular, this results in a y oscillation, stimulated by FC, as shown in FIG. 5d.

When double resonance is present, the real part of the y tapped-off signal is zero. It is not zero in the absence of double resonance. In both cases, with reset gyros, the Coriolis force FC is zeroed by a regulator Fyr which comprises FC. In the case of Coriolis gyros operated with double resonance, the imaginary part of y is zeroed by Fyr, and the real part of y is zeroed Fyi. The bandwidths of the two control processes are approximately 100 Hz.

Figure 1:
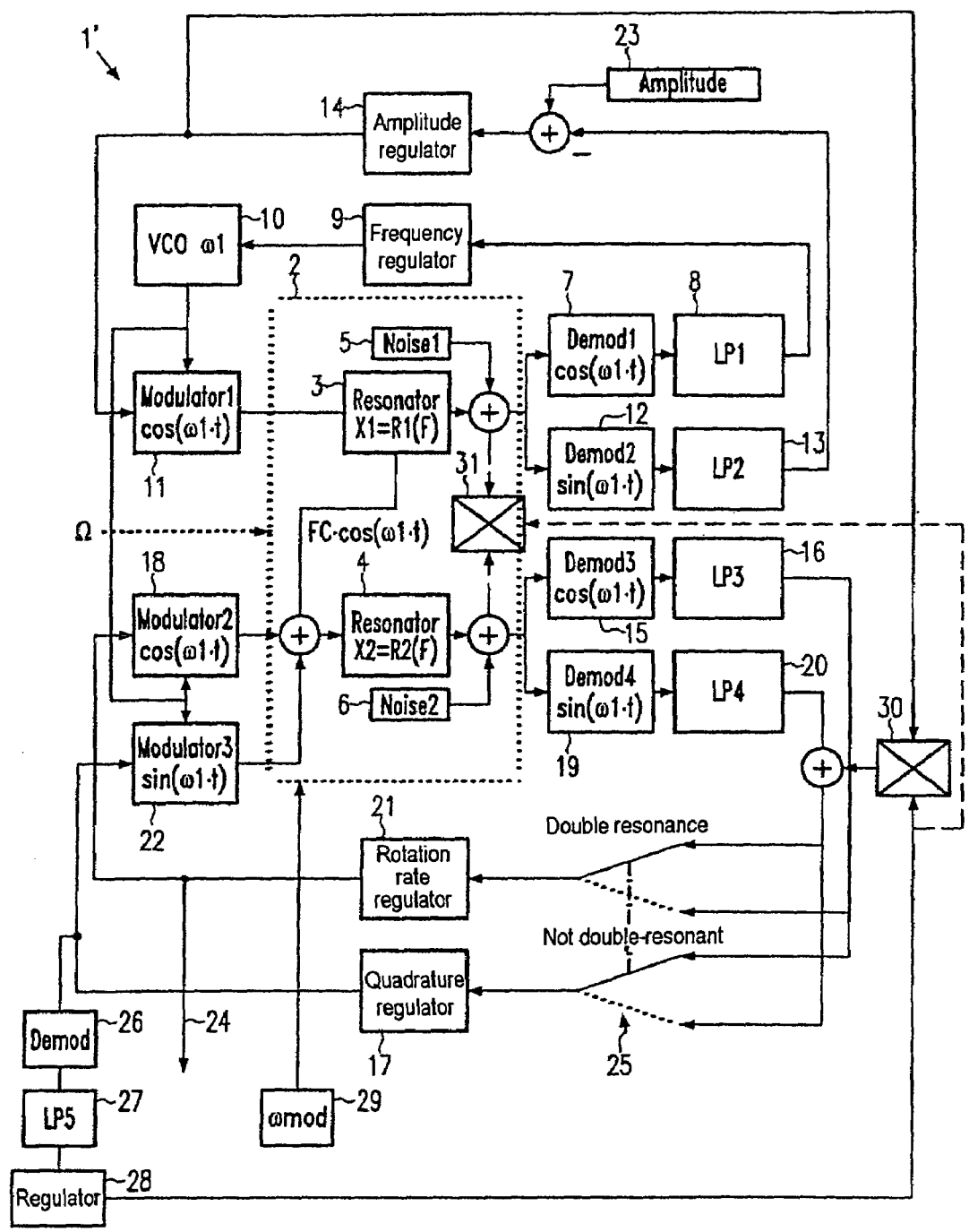
FIG. 1 is a schematic diagram of a Coriolis gyro in accordance with the invention.
Figure 2:
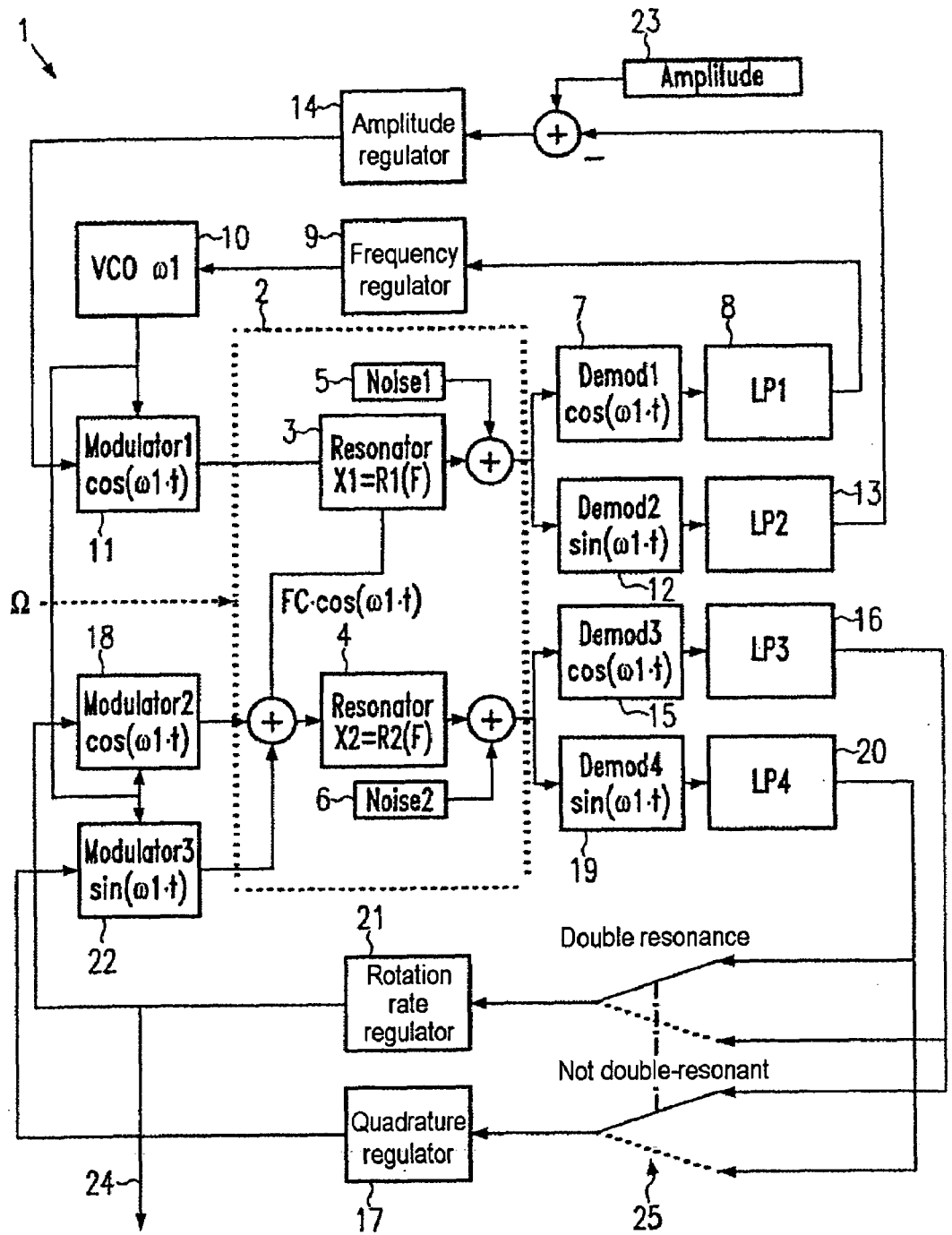
FIG. 2 is a schematic diagram of a Coriolis gyro in accordance with the prior art.

FIG. 1 is a schematic diagram of a Coriolis gyro in accordance with the invention. Parts corresponding to those of the prior art gyro of FIG. 2 are annotated with the same reference symbols and not again explained. The resetting Coriolis gyro 1' of FIG. 1 includes a demodulation unit 26, a fifth low-pass filter 27, a control unit 28, a modulation unit 29 and a first multiplier 30 or, alternatively, a second multiplier 31. The modulation unit 29 modulates the frequency of the read oscillation of the resonator 2 at ωmod. An output signal from the quadrature control loop is supplied to the demodulation unit 26. It demodulates this signal in synchronism with the frequency ωmod to obtain an auxiliary signal. Should there be any zero error (i.e. due, for example, to misalignments between the stimulating forces/resetting forces/force sensors/taps and the natural oscillations of the resonator 2) the strength of the auxiliary signal will then vary as a function of the frequency of the read oscillation.

The auxiliary signal is supplied to the fifth low-pass filter 27, which produces a low-pass-filtered signal and supplies it to the control unit 28. The control unit 28 employs the low-pass-filtered auxiliary signal to produce a signal which is applied to the first multiplier 30. This multiplies the signal emitted from the control unit 28 by a signal that originates from the amplitude regulator 14 to control the amplitude of the stimulating oscillation.

A compensation signal, obtained from the multiplication process, is added to the input to the rotation rate control loop. The control unit 28 controls the signal supplied to the first multiplier 30 so that the magnitude of the auxiliary signal is as small as possible. This corrects the zero error. The magnitude of the zero error can be determined by the compensation signal, which represents a measure of the zero error. Alternatively, the output signal from the control unit 28 can be supplied to the second multiplier 31, which multiplies this signal by the stimulating oscillation tapped-off signal and adds a compensation signal, produced in this way, to the read oscillation tapped-off signal. (The expression "control unit" is not restricted to the control unit 28 but may also mean the combination of the control unit 28 and the first or second multiplier 30,31). The signal supplied to the demodulation unit 26 may alternatively be tapped-off at a different point within the control loops.

The method of the invention can also be illustrated with reference to FIGS. 6a to 6d and 7a to 7d. The tap for the y oscillation (second resonator x2, 4) in general also "sees" a part of the x oscillation (first resonator x1, 3): a21*x. This produces a Coriolis gyro zero error (to be determined). FIGS. 6a through 6d illustrate the situation at double resonance, while FIGS. 7a through 7d illustrate the situation at close to double resonance. In both cases, the sum signal of the actual y movement and a21*x is "zeroed" by means of Fyi and Fyr. If a21 is not equal to zero, Fxr is not equal to zero when the rotation rate is zero (zero error). Fyi becomes zero only when double resonance is present. A quadrature bias results when there are discrepancies in the resonant frequencies.

Compensation for a21 is accomplished, according to the invention, as follows. The gyro is assumed to be at double resonance. The resonant frequency of the read oscillation (which can be electronically detuned) is modulated by the modulation unit 29 with a zero mean value (e.g. 55 Hz). The signal Fyi is demodulated by the demodulation unit 26 in synchronism when the resetting control loops are closed. If a21 were zero, then Fyi would not vary with frequency. That is, it changes only where a21 is not equal to zero. In the latter case, the low-pass-filtered, synchronously demodulated Fyi signal is not zero. The demodulated signal is supplied to the control unit 28 (preferably in the form of software), which controls a factor a21 comp (auxiliary variable). A controlled component of the x movement, a21 comp*x, is tapped off from the signal at the y tap (preferably in software). The magnitude of the component a21 comp is controlled so that the demodulated Fyi signal becomes zero. There is, therefore, no longer any x signal component in the signal from the y tap that has been cleaned in this way and the bias due to read cross-coupling disappears. At double resonance and with the same Q factors, a cross-coupling regulator would zero the bias caused by the read cross-coupling on its own. This is due to the fact that the modulation of Fxr also slightly modulates the amplitude of x. The sum of the force component of x in Fyr and the read component of x at the y tap is thus zeroed via the force cross-coupling regulator. The bias therefore disappears if the Q factor is the same.

It is also possible to use noise to modulate the read oscillation. Appropriate synchronous demodulation of the noise component in the read signal is then employed.

One major discovery on which the invention is based is that the output signal from the rotation rate control loop/ quadrature control loop changes as a result of a change in the frequency of the read oscillation only when there is a corresponding zero error (i.e. when misalignments exist between the stimulating forces/resetting forces/force sensors/taps and the natural oscillations of the resonator). Thus, if a compensation signal that compensates for the zero error in the read oscillation tapped-off signal caused by misalignments is passed to the input of the rotation rate control loop/quadrature control loop, or directly to the read oscillation tapped-off signal, the output signal from the rotation rate control loop/quadrature control loop does not change further in the event of a change in the frequency (in particular, a change in the resonant frequency) of the read oscillation. Since the change in the output signal from the rotation rate control loop/quadrature control loop is recorded by the auxiliary signal, the zero error can be determined and compensated for by controlling the compensation signal so that the auxiliary signal (and, thus, the change in the output signal from the control loop) is as small as possible. The frequency (resonant frequency) of the read oscillation is preferably modulated with zero mean value (e.g. at 55 Hz).

While this invention has been illustrated with reference to its presently-preferred embodiment, it is not limited thereto. Rather, the invention is limited only insofar as it is defined by the following set of patent claims and includes within its scope all equivalents thereof.

What is claimed is:

1. A method for compensation for a zero error in a Coriolis gyro in which:
   the frequency of a read oscillation is modulated,
   the output signal from a rotation rate control loop or quadrature control loop for the Coriolis gyro is demodulated in synchronism with the modulation of the frequency of the read oscillation in order to obtain an auxiliary signal which is a measure of the zero error,
   a compensation signal is produced, and is passed to an input of the rotation rate control loop or quadrature control loop, with
   the compensation signal being controlled such that the magnitude of the auxiliary signal is as small as possible.

2. The method as claimed in claim 1, characterized in that the modulation of the frequency of the read oscillation is a modulation with a zero mean value.

3. The method as claimed in claim 1, characterized in that the auxiliary signal is a low-pass-filtered, and the compensation signal is produced on the basis of the low-pass-filtered auxiliary signal.

4. The method as claimed in claim 1, characterized in that the compensation signal is produced by multiplication of a controlled signal, which is produced on the basis of the auxiliary signal, by a signal that originates from an amplitude regulator for controlling the amplitude of a stimulating oscillation.

5. The method as claimed in one of the preceding claims, characterized in that the auxiliary signal is determined from the output signal from the quadrature control loop, and the compensation signal is passed to an input of the rotation rate control loop.

6. A Coriolis gyro, characterized by a device for determination of the zero error of the Coriolis gyro having:
a modulation unit which modulates the frequency of the read oscillation of the Coriolis gyro,
a demodulation unit, which demodulates the output signal from a rotation rate control loop, or quadrature control loop of the Coriolis gyro in synchronism with the modulation of the frequency of the read oscillation, in order to obtain an auxiliary signal which is a measure of the zero error, and
a control unit, which produces a compensation signal and passes this to the input of the rotation rate control loop or quadrature control loop, with the control unit controlling the compensation signal such that the auxiliary signal is as small as possible.

* * * * *